(12) United States Patent
Sharma

(10) Patent No.: US 8,589,328 B1
(45) Date of Patent: Nov. 19, 2013

(54) METHOD AND APPARATUS FOR EXAMINING COMPUTER USER ACTIVITY TO ASSESS USER PSYCHOLOGY

(75) Inventor: Piyush Sharma, Pune, IN (US)

(73) Assignee: Symantec Corporation, Mountain View, CA (US)

(*) Notice: Subject to any disclaimer, the term of this patent is extended or adjusted under 35 U.S.C. 154(b) by 950 days.

(21) Appl. No.: 12/415,633

(22) Filed: Mar. 31, 2009

(51) Int. Cl.
*G06F 17/00* (2006.01)
*G06N 5/02* (2006.01)

(52) U.S. Cl.
USPC .......................................... 706/48; 434/236

(58) Field of Classification Search
USPC ....................................... 706/46, 48; 434/236
See application file for complete search history.

(56) References Cited

U.S. PATENT DOCUMENTS

| | | | | |
|---|---|---|---|---|
| 6,334,778 | B1* | 1/2002 | Brown | 434/236 |
| 6,757,691 | B1* | 6/2004 | Welsh et al. | 707/999.104 |
| 6,904,408 | B1* | 6/2005 | McCarthy et al. | 705/2 |
| 7,761,144 | B2* | 7/2010 | Cox et al. | 600/544 |
| 2002/0019764 | A1* | 2/2002 | Mascarenhas | 705/10 |
| 2002/0035573 | A1* | 3/2002 | Black et al. | 707/104.1 |
| 2002/0049606 | A1* | 4/2002 | Dan et al. | 709/201 |
| 2004/0186989 | A1* | 9/2004 | Clapper | 713/151 |
| 2005/0240960 | A1* | 10/2005 | Nagtzaam | 725/28 |
| 2006/0073451 | A1* | 4/2006 | Thornley | 434/236 |
| 2006/0161553 | A1* | 7/2006 | Woo | 707/10 |
| 2006/0253584 | A1* | 11/2006 | Dixon et al. | 709/225 |
| 2007/0048706 | A1* | 3/2007 | Tan | 434/236 |
| 2007/0060109 | A1* | 3/2007 | Ramer et al. | 455/414.1 |
| 2007/0180100 | A1* | 8/2007 | Biggs et al. | 709/224 |
| 2008/0005319 | A1* | 1/2008 | Anderholm et al. | 709/224 |
| 2008/0109473 | A1* | 5/2008 | Dixon et al. | 707/102 |
| 2009/0089417 | A1* | 4/2009 | Giffin et al. | 709/224 |
| 2009/0174551 | A1* | 7/2009 | Quinn et al. | 340/540 |
| 2009/0213001 | A1* | 8/2009 | Appelman et al. | 342/357.07 |
| 2009/0222329 | A1* | 9/2009 | Ramer et al. | 707/9 |
| 2010/0058383 | A1* | 3/2010 | Chang et al. | 725/35 |
| 2010/0180029 | A1* | 7/2010 | Fourman | 709/225 |

OTHER PUBLICATIONS

Chak, K. "Shyness and Locus of Control as Predictors of Internet Addiction and Internet Use", Thesis, The Chinese Univeristy of Hong Kong, May 2003, 26 pages.*

Landers, R.N. et al. "An investigation of Big Five and narrow personality traits in relation to Internet usage", Computers in Human Behavior 22. (2006) pp. 283-293. Available online Sep. 3, 2004.*

* cited by examiner

*Primary Examiner* — Jeffrey A Gaffin
*Assistant Examiner* — Benjamin Buss
(74) *Attorney, Agent, or Firm* — Wilmer Cutler Pickering Hale and Dorr LLP

(57) ABSTRACT

A method and apparatus for examining computer user activity to assess user psychology is provided. In one embodiment, a method for examining computer user activity to assess user psychology comprises monitoring the computer user activity in memory to generate, using at least one processor, pattern data associated with internet activity and comparing the pattern data in the memory with human behavior information using the at least one processor to identify personality indicia in the memory that reflects at least one psychological trait.

20 Claims, 3 Drawing Sheets

METHOD AND APPARATUS FOR EXAMINING COMPUTER USER ACTIVITY TO ASSESS USER PSYCHOLOGY

BACKGROUND

1. Field of the Invention

Embodiments of the present invention generally relate to computer user behavior monitoring systems and, more particularly, to a method and apparatus for examining computer user activity to assess user psychology.

2. Description of the Related Art

Due to the development and progression of computer and data networks, people are becoming Internet savvy and spend a significant amount of time browsing various websites in order to communicate with other people (e.g., through instant messages and emails), conduct research (e.g., through educational websites, digital libraries and expert discussion forums) and/or perform business applications. However, such an increase in the Internet usage has exposed computer users (e.g., children, adolescents) to inappropriate web sites and/or content. Occasionally, children and/or adolescents may attempt to access undesirable content. As an example, children may access a web site that hosts content portraying extreme violence or adult material. As another example, children may learn certain illicit activities (e.g., making explosives, hacking computer system hacking, committing fraud and/or the like) through various computer activities (e.g., Internet searching, file downloading, web sites browsed and/or the like). Parents or other caretakers have limited control over the content that is accessible through the Internet.

Currently, parents may utilize various parental control software programs to monitor various activities performed by their children. The available parental control software programs are to enforce a usage policy (e.g., restricting access to illegitimate web sites, destructive and/or inappropriate content and/or the like). However, the parental control software programs fail to provide information as to why the children were involved in such inappropriate and/or destructive activities. Further, such parental control software programs fail to analyze and provide information about the state of mind, behavior, and/or psychology of the children. Moreover, the parental control software programs do not warn and/or alert the parents as to any change in behavior Therefore, there is a need in the art for a method and apparatus for examining computer user activity to assess user psychology.

SUMMARY OF THE INVENTION

Embodiments of the present invention comprise a method and apparatus for examining computer user activity to assess user psychology. In one embodiment, a method for examining computer user activity to assess user psychology comprises monitoring the computer user activity to generate pattern data associated with internet activity and comparing the pattern data with human behavior information to identify personality indicia that reflects at least one psychological trait.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
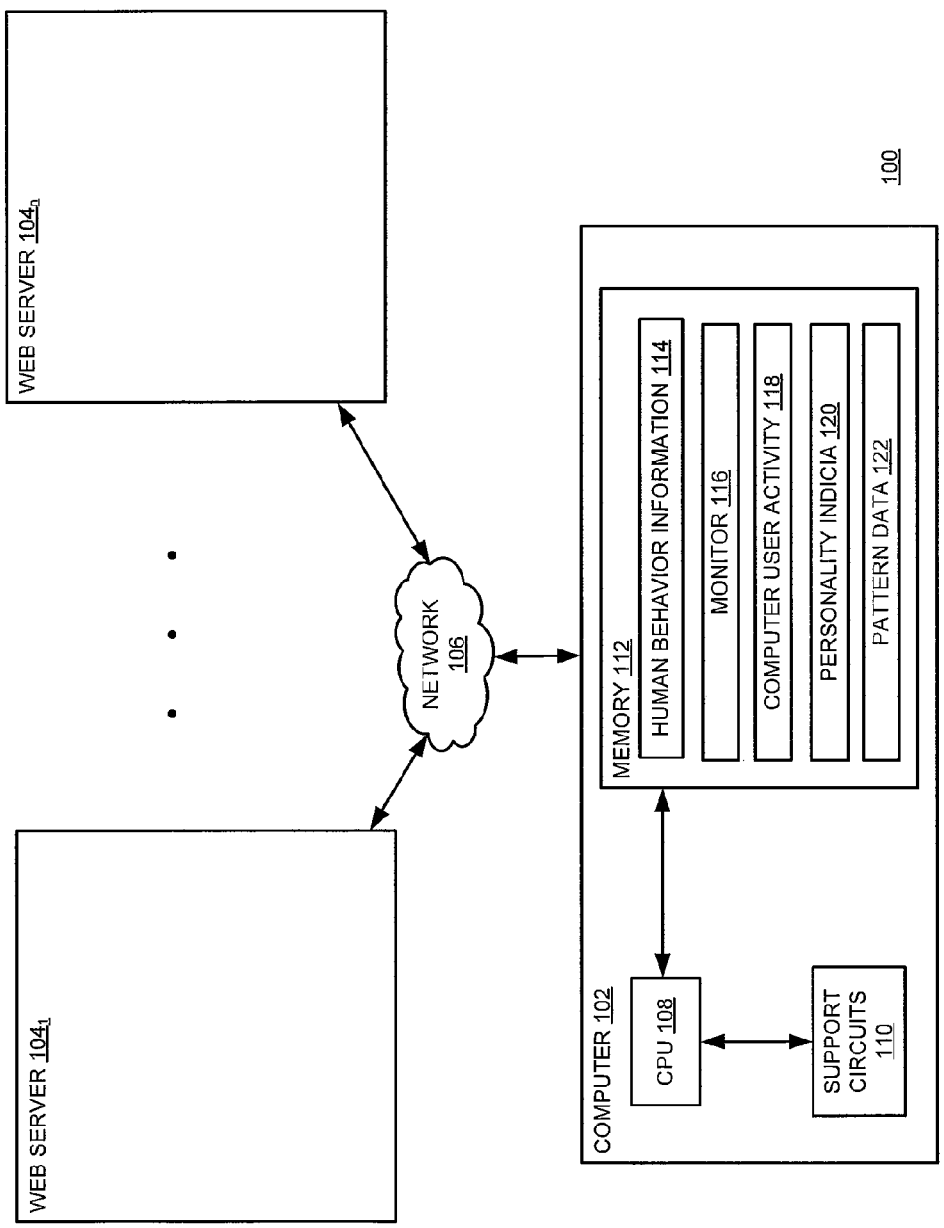
FIG. 1 is a block diagram of a system for examining computer user activity to assess user psychology, according to various embodiments of the invention.

FIG. 1 is a block diagram of a system 100 for examining computer user activity to assess user psychology according to one embodiment. The system 100 includes a computer 102 and a plurality of web servers 104, where each coupled to one another through a network 106. Each web server of the plurality of web servers 104 may be a computing device that hosts one or more web sites, databases, file sharing applications and/or the like. Internet activity between a user and the plurality of web server 104 may be examined to determine frequencies of keywords, domain names, file downloads and/or the like. Such frequencies may reflect one or more psychological traits associated with the user based on human behavior information that is collected from various behavior science data sources as explained further below.

The computer 102 is a type of computing device (e.g., a laptop, a desktop, a Personal Digital Assistant (PDA) and/or the like), such as those generally known in the art. The computer 102 includes a Central Processing Unit (CPU) 108, various support circuits 110 and a memory 112. The CPU 108 may comprise one or more commercially available microprocessors or microcontrollers that facilitate data processing and storage. The various support circuits 110 facilitate the operation of the CPU 108 and include one or more clock circuits, power supplies, cache, input/output circuits, and the like. The memory 112 comprises at least one of Read Only Memory (ROM), Random Access Memory (RAM), disk drive storage, optical storage, removable storage and/or the like. The memory 112 includes various databases, such as human behavior information 114. The memory 112 includes various software packages, such as a monitor 116. The memory 112 further includes various data, such as computer user activity 118, personality indicia 120 and pattern data 122.

The network 106 comprises a communication system that connects computers by wire, cable, fiber optic and/or wireless link facilitated by various types of well-known network elements, such as hubs, switches, routers, and the like. The network 106 may employ various well-known protocols to communicate information amongst the network resources. For example, the network 106 may be a part of the Internet or Intranet using various communications infrastructure such as Ethernet, WiFi, WiMax, General Packet Radio Service (GPRS), and the like.

According to various embodiments, the human behavior information 114 indicates various activities that reflect one or more psychological traits related to human behavior. In one or more embodiments, the human behavior information 114 may include categories associated with each human behavior. Such categories may include but not limited to creative, expressive, constructive, destructive, self-destructive creative but destructive, creative but self-destructive and/or the like. In one embodiment, the human behavior information 114 may be categorized on the basis of age group, gender, environment and/or the like. For example, the human behavior information 114 may be a database that is the pre-populated to include various types of keyword patterns based on human behavioral science research. Hence, the human behavior information 114 may be collected and aggregated from various information sources (e.g., questionnaires (e.g., Myers-Briggs personality test), surveys for children and parents, expert analysis, databases for independent consulting companies (http://www.behavioranalysis.com/) and/or the like).

According to various embodiments, the CPU 108 executes the monitor 116 stored in the memory 114 to process the computer user activity 118. In one or more embodiments, the computer user activity 118 maintains records of various user activities (e.g., downloading files, accessing web sites, playing games, and/or the like) performed on the computer 102. According to one embodiment, the computer user activity 118 includes information regarding various internet activities engaged by a user of the computer 102, such as file downloads and search keywords. For example, the computer user activity 118 may be a cookie file or a log file of one or more sessions initiated by the user or a browser history file. The computer user activity 118 indicates one or more websites accessed by the user of the computer 102 as well as one or more downloaded files and/or one or more keywords (e.g., search keywords for a search engine, such as GOOGLE).

For example, the user may regularly access one or more websites hosted by the plurality of web servers 104 to communicate with other users (e.g., through Instant Messaging (IM) and/or emails), conduct research (e.g., through educational websites, digital libraries and expert discussion forums), perform business applications (e.g., online securities trading and bank account management), for personal entertainment (e.g., playing online videos or games) and/or the like. In either example, the computer user activity 118 includes various data associated with accessed websites, such as a URL (Uniform Resource Locator), domain name, search strings, key words, and/or the like.

The pattern data 122 includes frequencies associated with various internet activities such as search engine keywords, domain names, email/instant message content and/or the like. In one or more embodiments, the pattern data 122 includes keywords identified and/or extracted by a monitoring function of the monitor 116 from the computer user activity 118. The monitor 116 examines the computer user activity 118 to identify one or more keywords (i.e., keywords that are used in search engines, emails, instant messages, web pages and/or the like) that are associated with a particular user. For example, a browser history indicates that keywords "malware", "hack" and "identity theft" appeared thirty, twenty and fifty times respectively in search engine searches (e.g., GOOGLE searches). As another example, the browser history indicate that domain names "dobad.com", "hackers.com" and "warez.com" were visited ten, fifty and five times over a month respectively. One or more patterns may be generated to include these keyword and domain name frequencies. As described below, the one or more patterns may reflect a destructive personality trait for the user.

In one embodiment, the monitor 116 is executed by the CPU 108 to generate the pattern data 122 periodically (i.e., after a fixed pre-defined time interval or a variable time interval). Once the pattern data 122 is generated, the monitor 116 compares the pattern data 122 with the human behavior information 114 to identify the personality indicia 120. Based on an analysis of such the personality indicia 120, the monitor 116 is executed by the CPU 108 to identify one or more psychology traits and determine if the user of the user computer 102 is likely to be involved in various activities, such as but not limited to dangerous, destructive, creative, expressive, constructive, self-destructive, creative but self-destructive, creative but destructive and/or the like. Alternatively, the monitor 116 may be remote monitoring software that is executed by a processor to perform the comparison between the pattern data 122 and the human behavior information 114 from a remote location. Furthermore, the remote monitor software may produce psychology reports from the personality indicia 120 and provide one or more parents with such psychology reports.

For example, a particular pattern in the pattern data 122 may include frequencies of thirty, twenty and fifty times for the keywords "malware", "hack" and "identity theft" respectively in search engine searches (e.g., GOOGLE searches) and frequencies of ten, fifty and five times for the domain names "dobad.com", "hackers.com" and "warez.com" for a period of Internet activity by the user that exceeds a month. The human behavior information 114 may include a pre-defined pattern that indicates various frequencies for keywords and domain names associated with destructive behavior. If such a pre-defined pattern includes frequencies for the keywords "malware", "hack" and "identity theft" and the domain names "dobad.com", "hackers.com" and "warez.com" equals the frequencies of the particular pattern of the pattern data 122, then the user most likely exhibits destructive behavior.

The personality indicia 120 reflects the user psychology based on computer user activity 118. In one embodiment, the personality indicia 120 may be used to determine whether the computer user activity 118 reflects a psychological trait, such as but not limited to dangerous, destructive, creative, creative but destructive and/or like. In one embodiment, the personality indicia 120 may be provided in order to counsel and/or alert parents, care-takers, guardians and/or the like with respect to states of mind of their children. In one embodiment, the personality indicia 120 reflects one or more psychological traits of the user, which may indicate reasons behind the enticement of such activities to the children.

Figure 2:
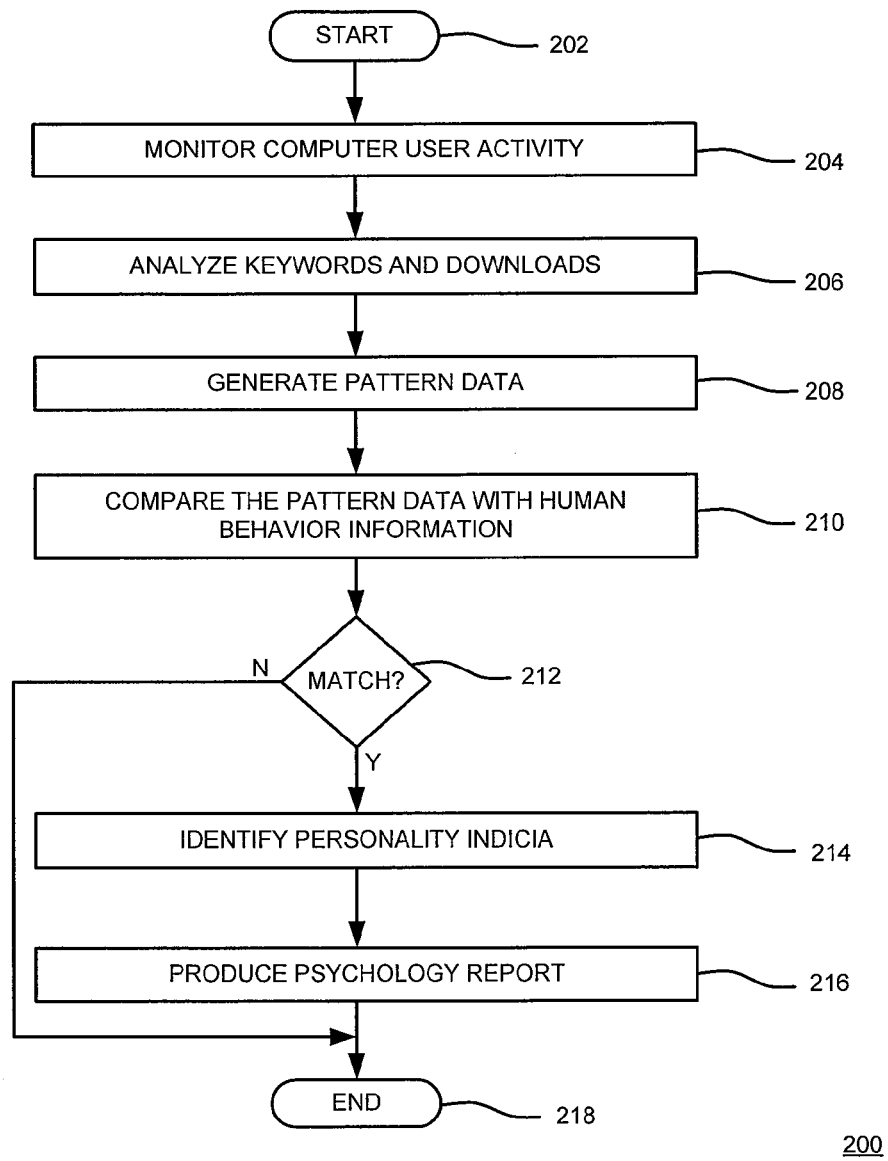
FIG. 2 is a flow diagram of a method for examining computer user activity to assess user psychology, according to various embodiments of the invention.

FIG. 2 is a flow diagram of a method 200 for examining computer user activity to assess user psychology according to one embodiment. The method 200 starts at step 202 and proceeds to step 204, at which computer user activity (e.g., the computer user activity 118 of FIG. 1) is monitored. In some embodiments, monitor software (e.g., the monitor 116 of FIG. 1) performs step 202 to step 218. At step 206, search keywords and file downloads are analyzed. At step 208, pattern data (e.g., the pattern data 122 of FIG. 1) is generated.

At step 210, the pattern data is compared with human behavior information (e.g., the human behavior information 114 of FIG. 1). At step 212, a determination is made as to whether there is a match between the pattern data and the human behavior information. If it is determined that a match does not exists between the pattern data and the human behavior information (option "NO"), then the method 200 proceeds to step 218. If, at step 212, it is determined that a match exists between the pattern data and the human behavior information (option "YES"), then the method 200 proceeds to step 214. At step 214, personality indicia (e.g., the personality indicia 120 of FIG. 1) are identified. At step 216, a psychology report is produced. The method 200 proceeds to step 218, where the method 200 ends.

Figure 3:
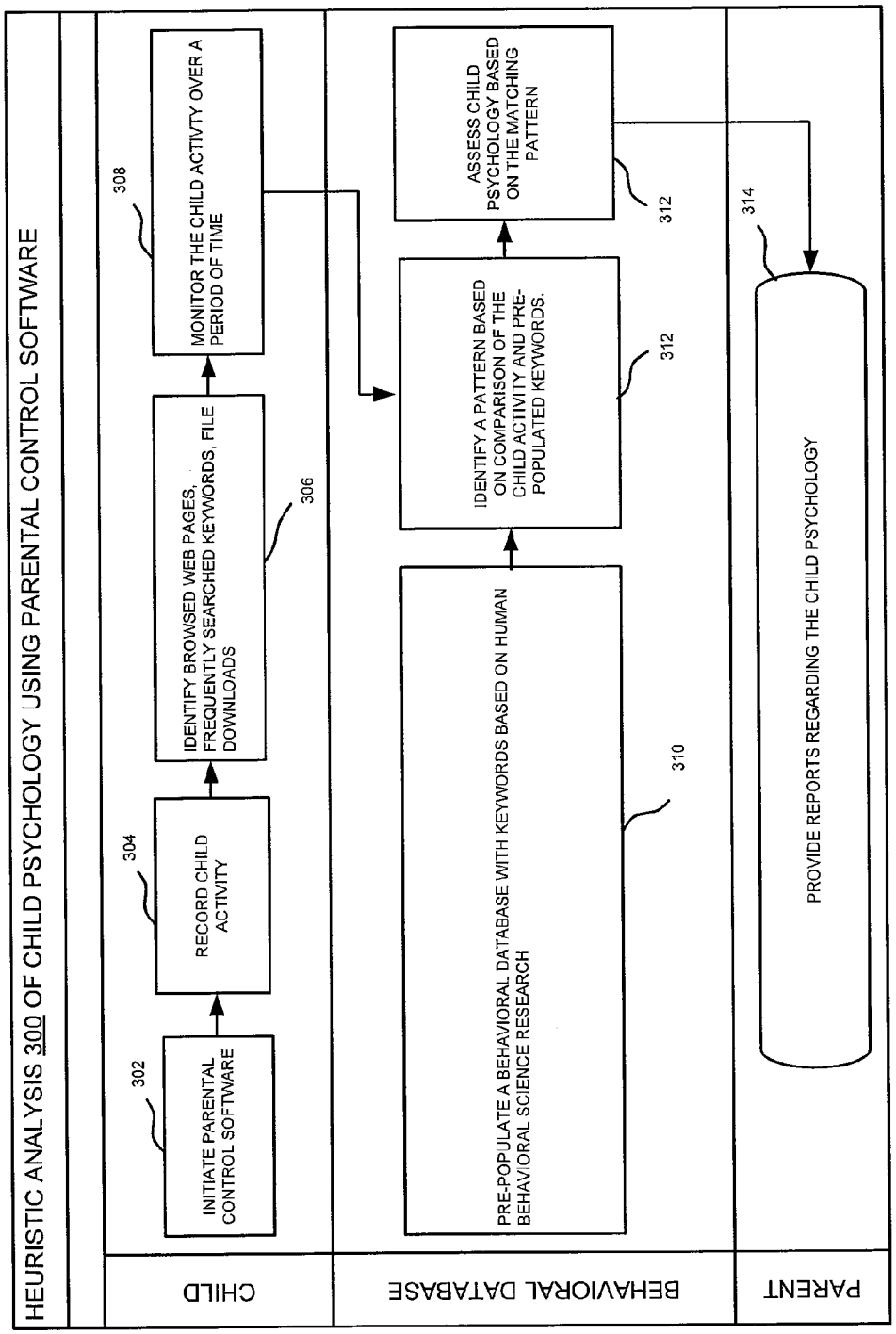
FIG. 3 is an interaction diagram that illustrates a heuristic analysis of child psychology utilizing parent control software according to various embodiments of the invention.

FIG. 3 is an interaction diagram that illustrates a heuristic analysis 300 of child psychology utilizing parent control software according to one embodiment of the invention. The heuristic analysis 300 starts at step 302, at which parental control software (e.g., the monitor 116 of FIG. 1) is initiated on a computer (e.g., the computer 102). At step 304, child activity (e.g., the computer user activity 118 of FIG. 1) is recorded. At step 306, browsed web pages, frequently searched keywords (i.e., search strings) and/or downloaded files are identified. At step 308, the child activity is monitored to assess child psychology. At step 310, a behavioral database (e.g., the human behavior information 114) is pre-populated with keywords based in human behavioral research science.

At step 312, a matching pattern is identified based on a comparison between the child activity and the pre-populated keywords. At step 314, the child psychology is assessed based on the matching pattern. At step 316, reports regarding the child psychology are generated. These reports may reflect a state of mind of the child and warn and/or alert a parent of any destructive and/or dangerous psychological traits. Furthermore, the reports may guide the parent may utilize the reports to ascertain reasons as to why their children browsed certain websites, downloaded particular files and/or used particular search keywords. After step 314, the heuristic analysis 300 ends.

While the foregoing is directed to embodiments of the present invention, other and further embodiments of the invention may be devised without departing from the basic scope thereof, and the scope thereof is determined by the claims that follow.

The invention claimed is:

1. A method for examining computer user activity to assess user psychology, comprising:
   monitoring internet activity of a computer user using at least one computer processor;
   generating pattern data based on the internet activity, the pattern data indicating a frequency of a particular internet activity;
   comparing the pattern data with human behavior information using the at least one computer processor to determine whether the pattern data matches the human behavior information, wherein comparing the pattern data with human behavior information comprises comparing the frequency of the particular internet activity in the pattern data with pre-populated keyword patterns based upon human behavioral research science to determine whether the frequency exceeds a threshold corresponding to the pre-populated keyword patterns;
   identifying personality indicia that reflects at least one psychological trait of the computer user when it is determined that the pattern data matches the human behavior information; and
   generating a report regarding the at least one psychology trait when it is determined that the pattern data matches the human behavior information.

2. The method of claim 1, wherein monitoring the computer user activity comprises examining the computer user activity to identify keywords used in search engine searches.

3. The method of claim 1, wherein the human behavior information is based on at least one of a plurality of personality tests, a plurality of behavior surveys, and behavior expert analysis and categories for human behavior information comprise at least one of creative, expressive, constructive, destructive, self-destructive, creative but destructive, or creative but self-destructive.

4. The method of claim 1, wherein the pattern data comprises frequencies of at least one of domain names, search engine keywords or files names, wherein the pattern data is generated at predetermined intervals, and wherein the pattern data is based on the internet activity stored in one of a cookie file, a log file, and a browser history file.

5. The method of claim 1, further comprising:
   not identifying the personality indicia and not generating the report regarding the at least one psychology trait when it is determined that the pattern data does not match the human behavior information.

6. The method of claim 1, further comprising:
   initiating parental control software prior to monitoring the computer user activity.

7. The method of claim 1, wherein at least one of the human behavior information, computer user activity, personality indicia, and pattern data is stored in memory associated with the at least one computer processor.

8. An apparatus for examining computer user activity to assess user psychology, comprising:
   at least one computer processor; and
   a monitor that examines internet activity of a computer user using the at least one computer processor, generates pattern data based on the internet activity, the pattern data indicating a frequency of a particular internet activity, and compares the frequency of the particular internet activity in the pattern data with human behavior information using the at least one computer processor to determine whether the pattern data matches the human behavior information, wherein comparing the pattern data with human behavior information comprises comparing the frequency of the particular internet activity in the pattern data with pre-populated keyword patterns based upon human behavioral research science to determine whether the frequency exceeds a threshold corresponding to the pre-populated keyword patterns to identify personality indicia that reflects at least one psychological trait of the computer user when it is determined that the pattern data matches the human behavior information and generate a report regarding the at least one psychology trait when it is determined that the pattern data matches the human behavior information.

9. The apparatus of claim 8, wherein the monitor examines the computer user activity to identify keywords associated with internet activity used in search engine searches.

10. The apparatus of claim 8, wherein the human behavior information is based on at least one of a plurality of personality tests, a plurality of behavior surveys, and behavior expert analysis and categories for the human behavior information comprise patterns associated with at least one of creative, expressive, constructive, destructive, self-destructive, creative but destructive, or creative but self-destructive.

11. The apparatus of claim 8, wherein the pattern data comprises frequencies of at least one of domain names, search engine keywords or files names, wherein the pattern data is generated at predetermined intervals, and wherein the pattern data is based on the internet activity stored in one of a cookie file, a log file, and a browser history file.

12. The apparatus of claim 8, further comprising:
   parental control software that is initiated prior to monitoring the computer user activity.

13. The apparatus of claim 8, wherein at least one of the human behavior information, computer user activity, personality indicia, and pattern data is stored in memory associated with the at least one computer processor.

14. A computer-readable-storage medium comprising one or more processor-executable instructions that, when executed by at least one computer processor, causes the at least one computer processor to:
   examine internet activity of a computer user;
   generate pattern data based on the internet activity, the pattern data indicating a frequency of a particular internet activity;

compare the frequency of the particular internet activity in the pattern data with human behavior information to determine whether the pattern data matches the human behavior information, wherein comparing the frequency of the particular internet activity in the pattern data with human behavior information comprises comparing the pattern data with pre-populated keyword patterns based upon human behavioral research science to determine whether the frequency exceeds a threshold corresponding to the pre-populated keyword patterns;

identify personality indicia that reflects at least one psychological trait of the computer user when it is determined that the pattern data matches the human behavior information; and generate a report regarding the at least one psychology trait when it is determined that the pattern data matches the human behavior information.

15. The computer-readable-storage medium of claim 14, further comprising:
one or more processor-executable instructions that, when executed by the at least one computer processor, causes the at least one computer processor to:
identify keywords associated searching the Internet.

16. The computer-readable-storage medium of claim 14, wherein the human behavior information is based on at least one of a plurality of personality tests, a plurality of behavior surveys, and behavior expert analysis and the at least one psychological trait comprises at least one of creative, expressive, constructive, destructive, self-destructive, creative but destructive, or creative but self-destructive.

17. The computer-readable-storage medium of claim 14, wherein the pattern data comprises frequencies of at least one of domain names, search engine keywords or files names, wherein the pattern data is generated at predetermined intervals, and wherein the pattern data is based on the internet activity stored in one of a cookie file, a log file, and a browser history file.

18. The computer-readable-storage medium of claim 14, further comprising:
one or more processor-executable instructions that, when executed by the at least one computer processor, causes the at least one computer processor to:
not identify the personality indicia and not generate the report regarding the at least one psychology trait when it is determined that the pattern data does not match the human behavior information.

19. The computer-readable-storage medium of claim 14, further comprising:
one or more processor-executable instructions that, when executed by the at least one computer processor, cause the at least one computer processor to:
initiate parental control software prior to monitoring the computer user activity.

20. The computer-readable-storage medium of claim 14, wherein at least one of the human behavior information, computer user activity, personality indicia, and pattern data is stored in memory associated with the at least one computer processor.

* * * * *